(12) United States Patent
Ikegami

(10) Patent No.: US 10,796,165 B2
(45) Date of Patent: Oct. 6, 2020

(54) INFORMATION PROCESSING APPARATUS, METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Hideyuki Ikegami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 16/033,575

(22) Filed: Jul. 12, 2018

(65) Prior Publication Data

US 2019/0026565 A1 Jan. 24, 2019

(30) Foreign Application Priority Data

Jul. 18, 2017 (JP) .................................. 2017-139263

(51) Int. Cl.
*G06K 9/00* (2006.01)
*G06Q 30/02* (2012.01)
*G06K 9/03* (2006.01)

(52) U.S. Cl.
CPC ..... *G06K 9/00778* (2013.01); *G06K 9/00771* (2013.01); *G06K 9/00993* (2013.01); *G06K 9/03* (2013.01); *G06Q 30/0281* (2013.01)

(58) Field of Classification Search
CPC .... G06F 3/011; G06F 3/0304; G06F 16/2264; G06F 16/9024; G06F 3/0346; A63F 13/213; A63F 13/24; A63F 13/426; A63F 13/428; A63F 13/655; A63F 13/00; G06T 7/73; G06K 9/00771; G06K 9/6202; G06K 9/00221; G06K 9/00335; G06K 9/00369; G06K 9/627; G06K 9/00718; G06K 9/6256; H04N 7/181; H04N 5/2226; G08C 17/02; G08C 17/00; G06N 3/04; G06N 3/08
See application file for complete search history.

(56) References Cited

U.S. PATENT DOCUMENTS

2017/0364724 A1* 12/2017 Hachimura .......... G06K 7/1443

FOREIGN PATENT DOCUMENTS

JP 2004287752 A 10/2004
JP 2008217289 A 9/2008

* cited by examiner

*Primary Examiner* — Duy M Dang
(74) *Attorney, Agent, or Firm* — Venable LLP

(57) ABSTRACT

An information processing apparatus detects an object that enters or exits a predetermined region, manages, in a queue, data based on the detection, and counts the number of predetermined object(s) based on an image obtained by capturing the predetermined region. The apparatus, in a case where the predetermined object is detected, the queue is corrected based on the number counted by and the number of data managed in the queue.

21 Claims, 16 Drawing Sheets

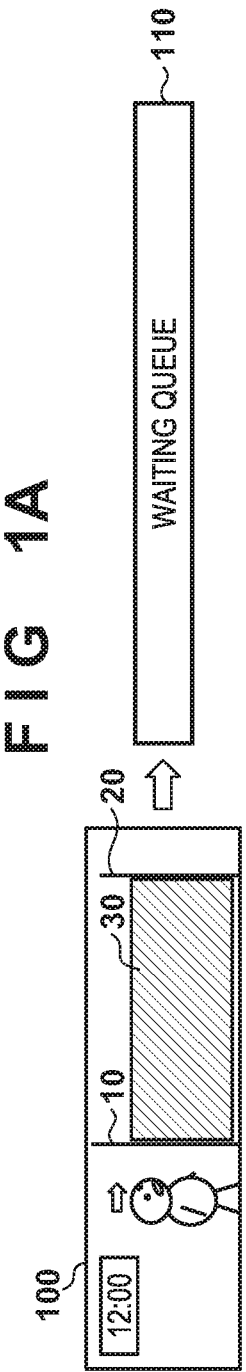
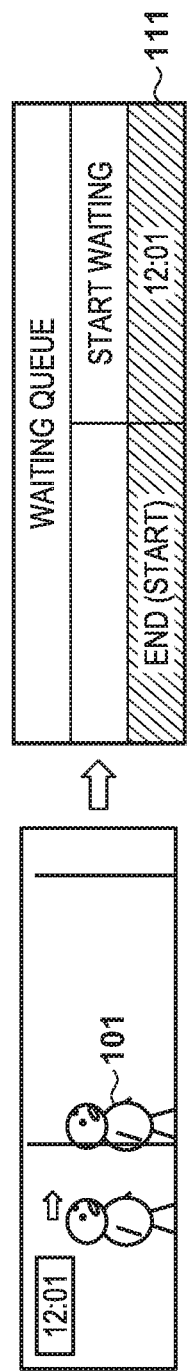
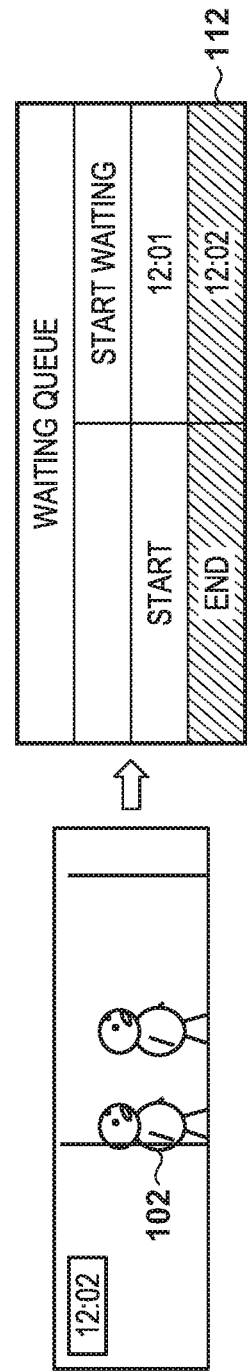

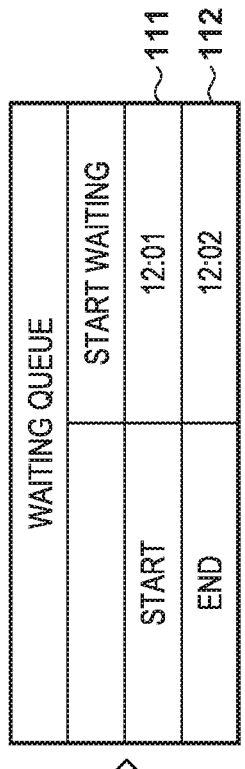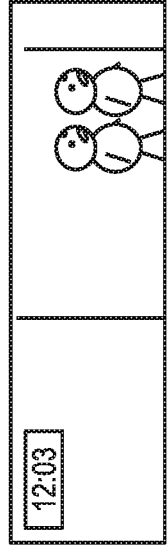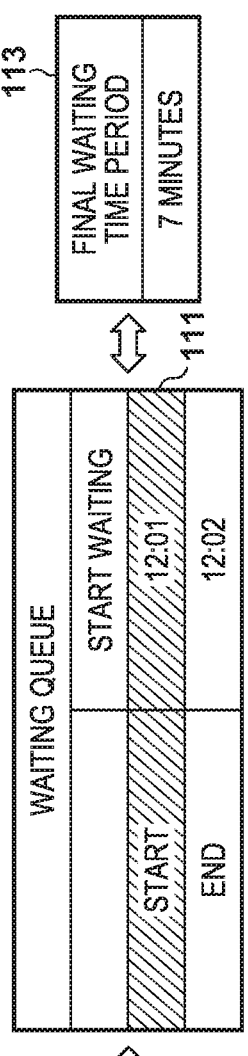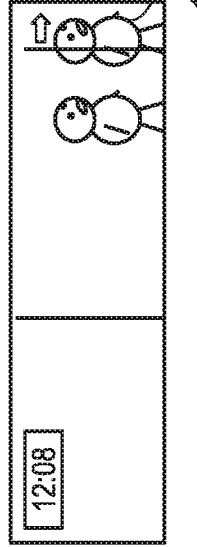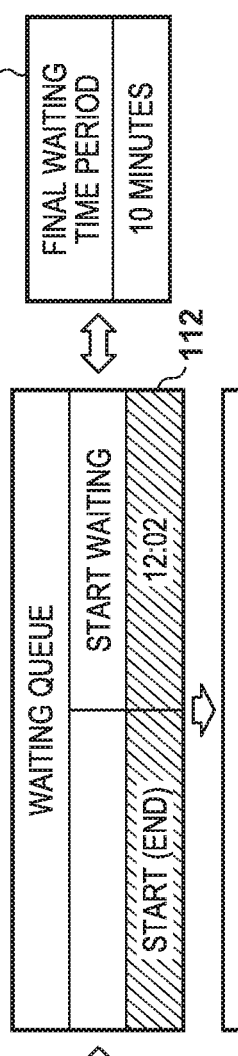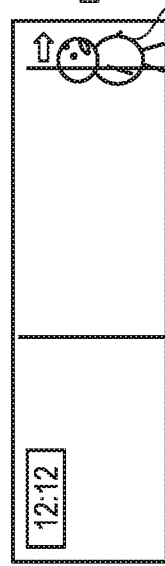

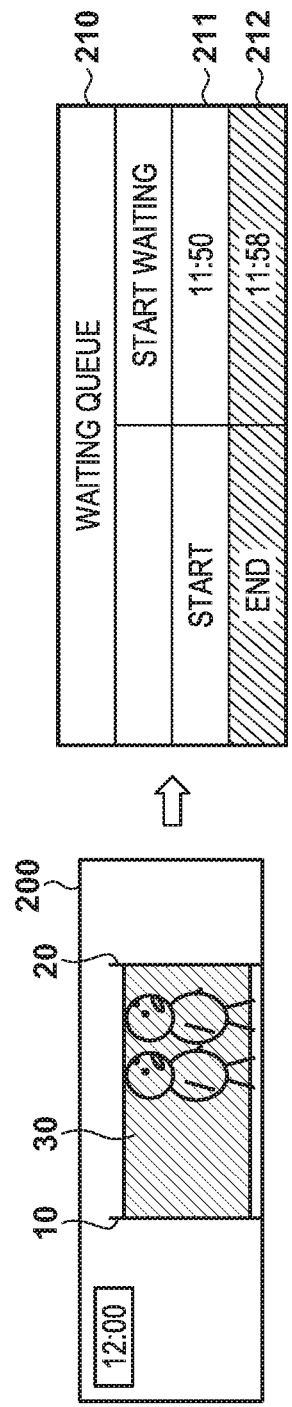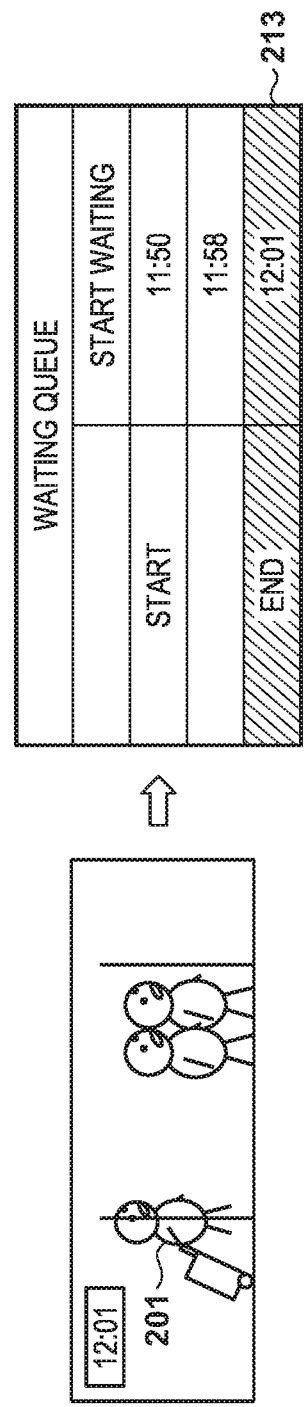

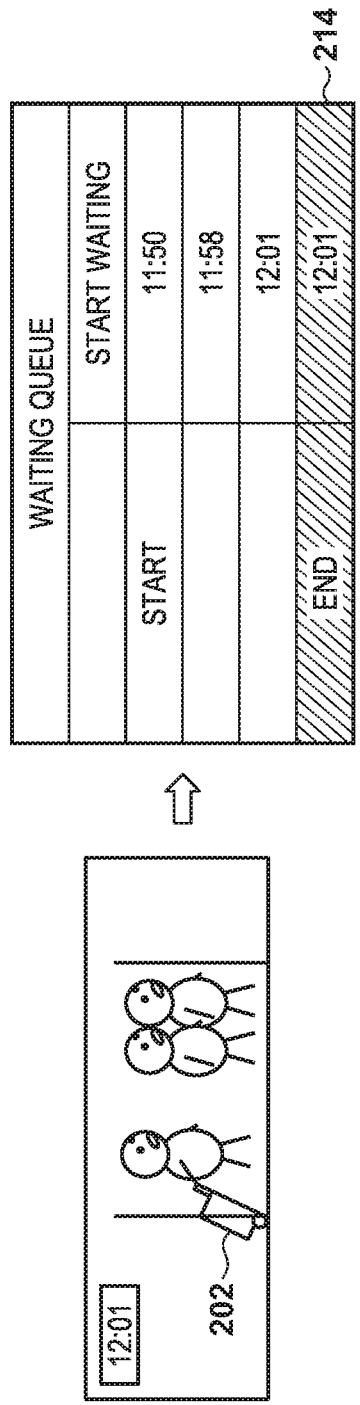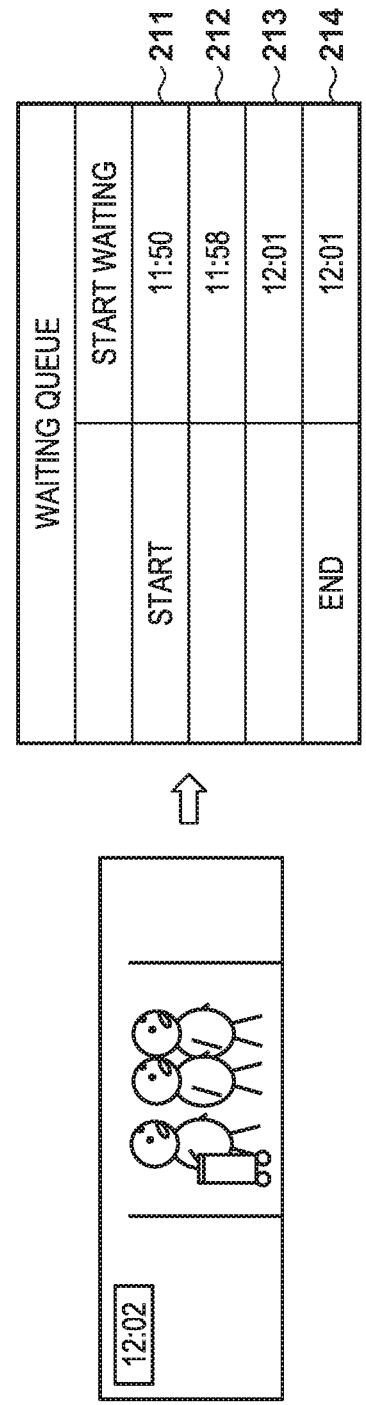

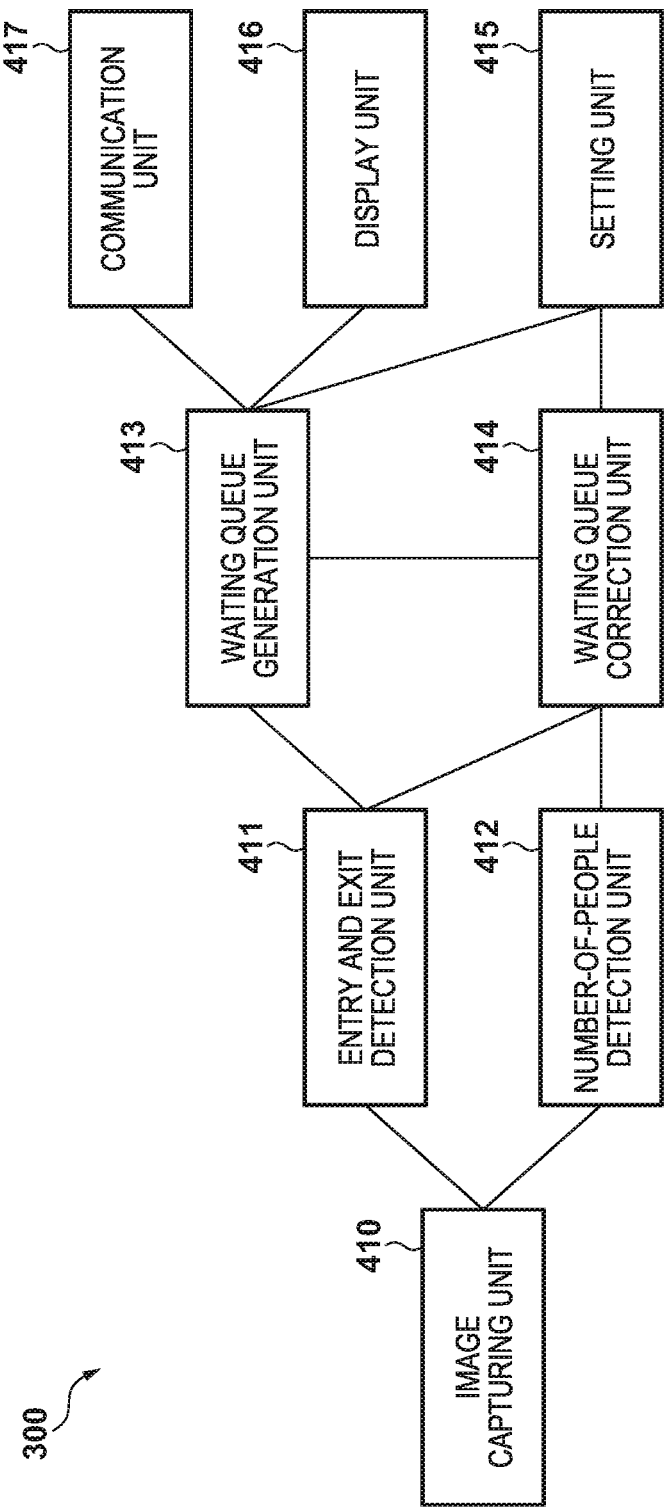

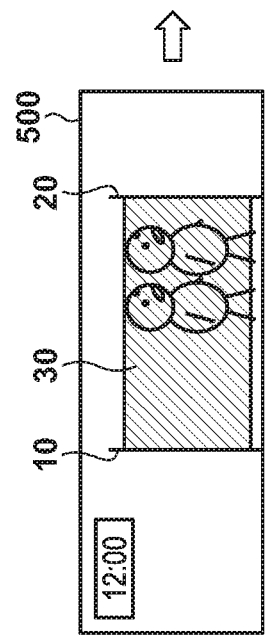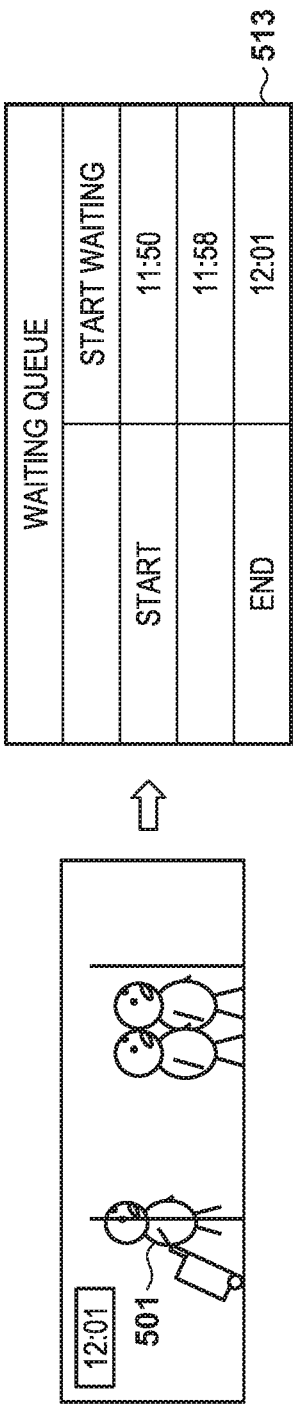
FIG. 5A
FIG. 5B

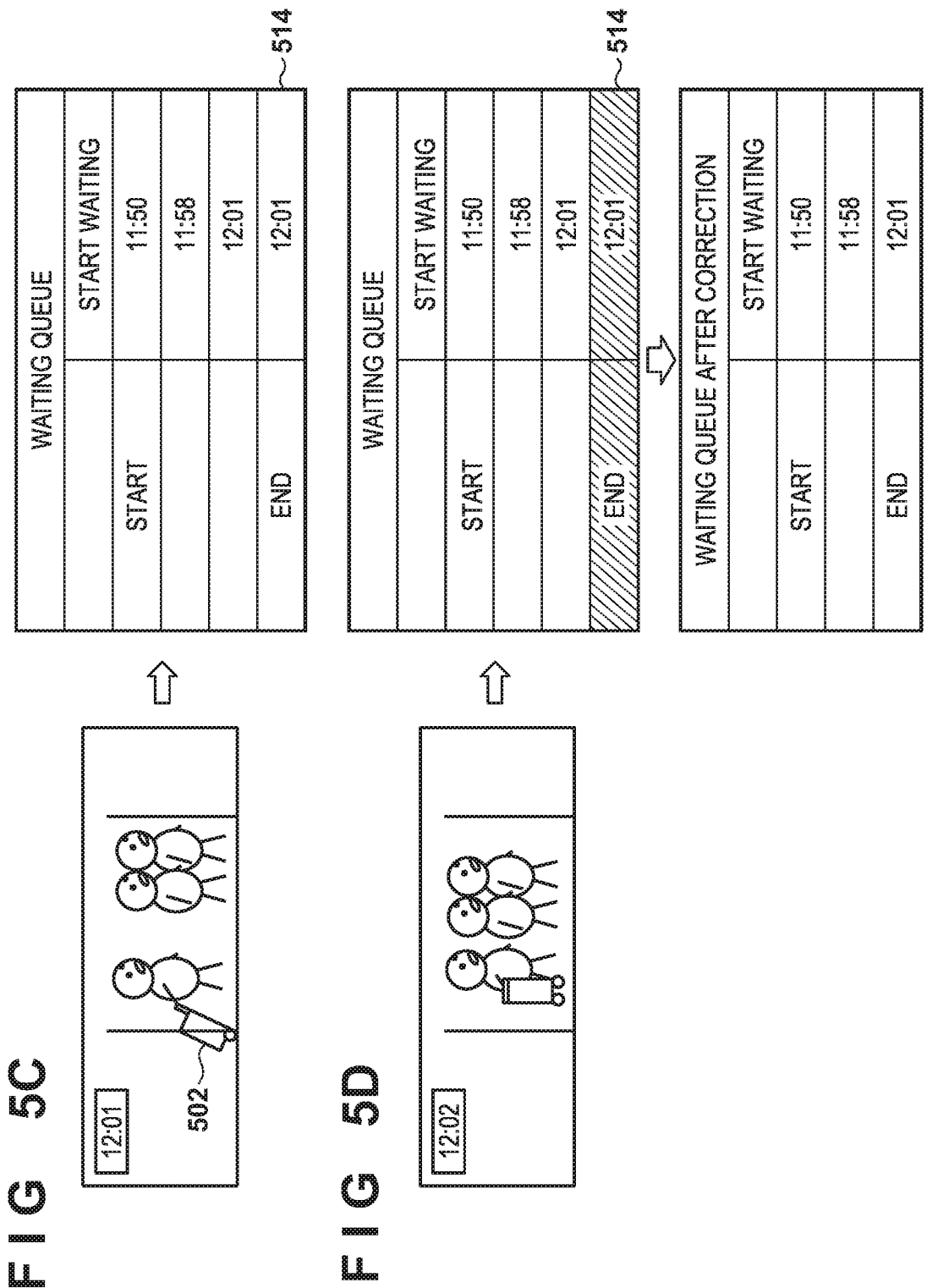

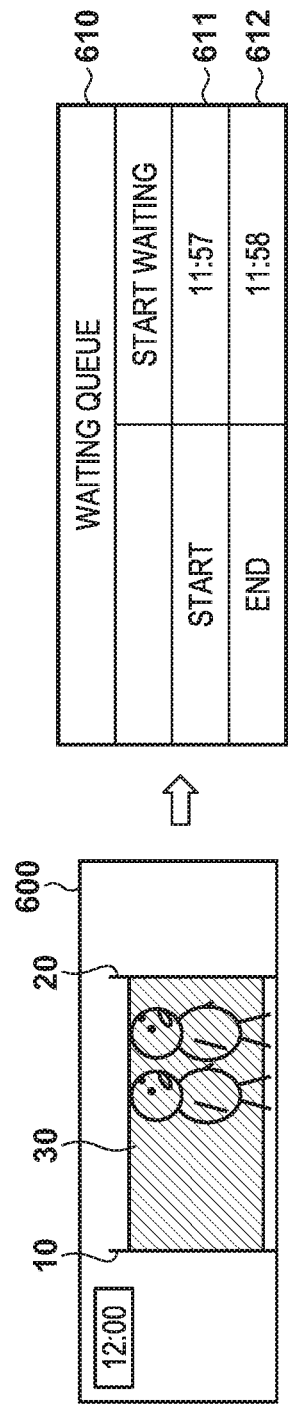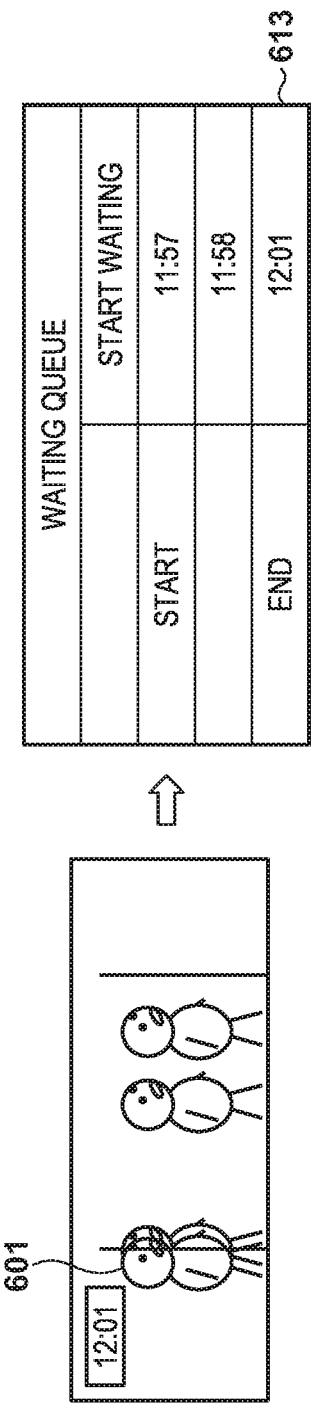
FIG. 6A
FIG. 6B

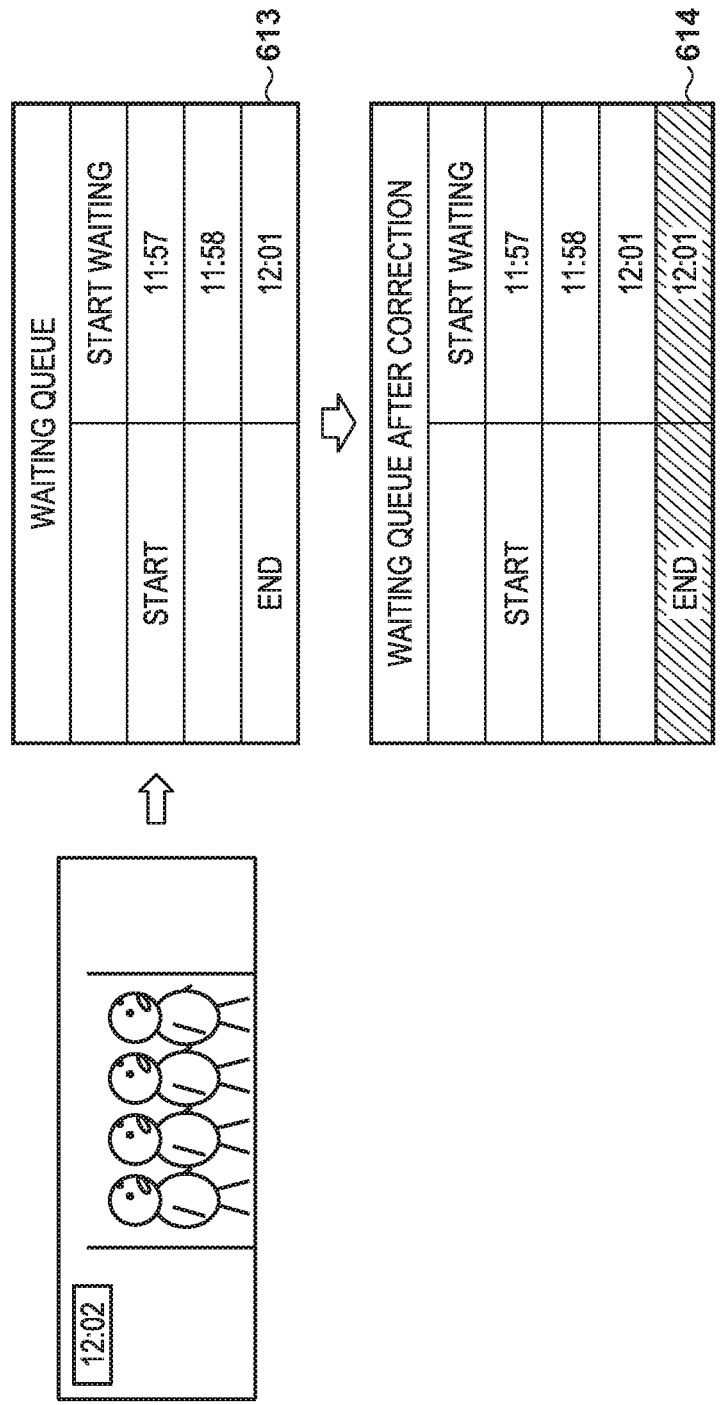

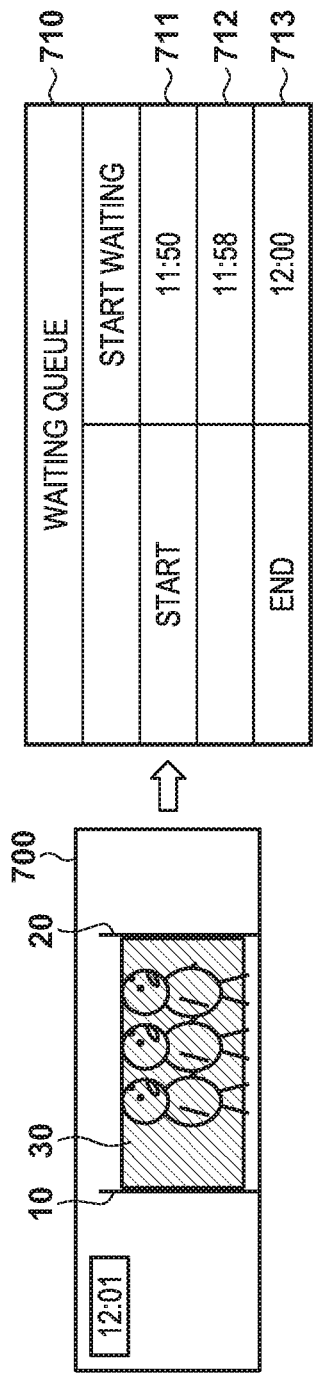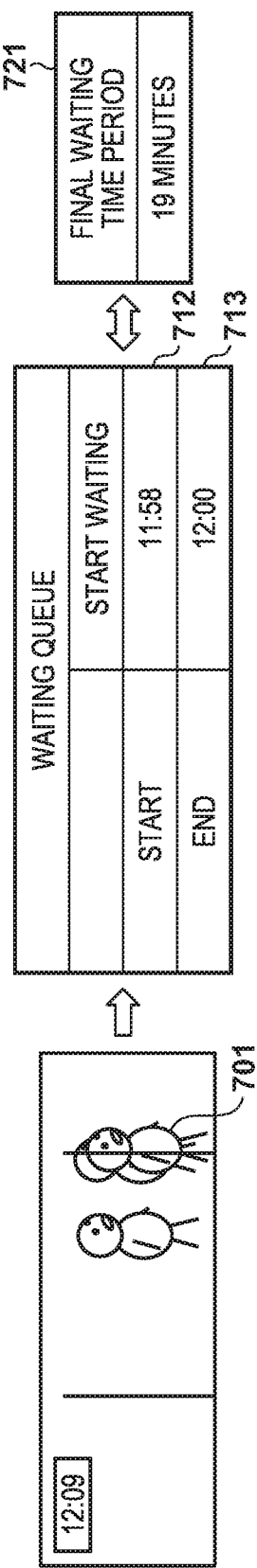

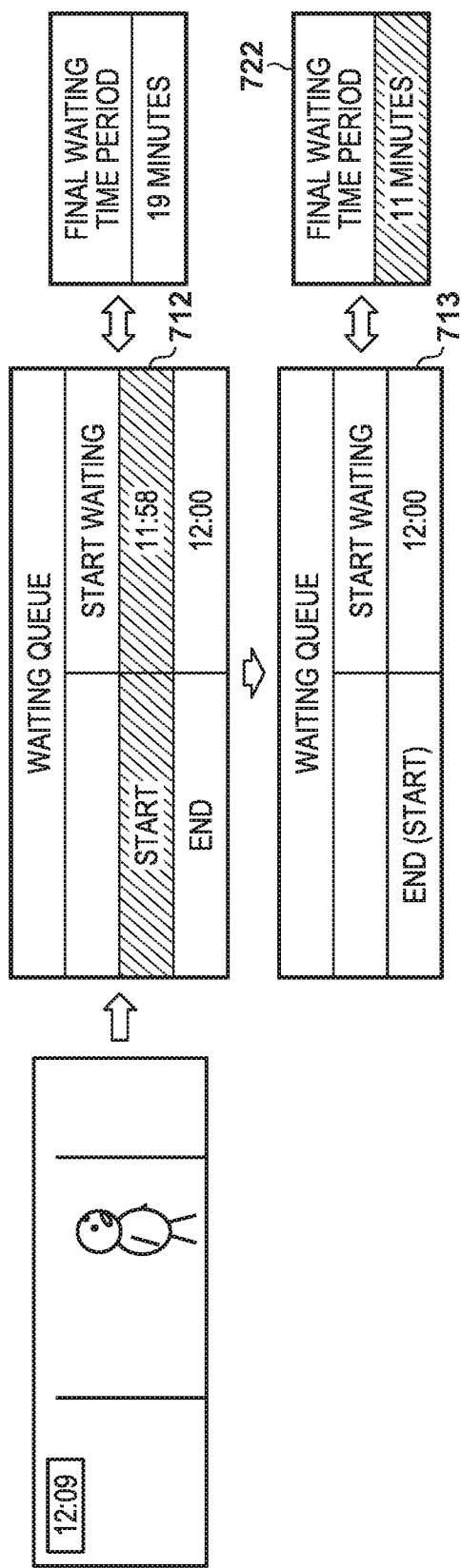

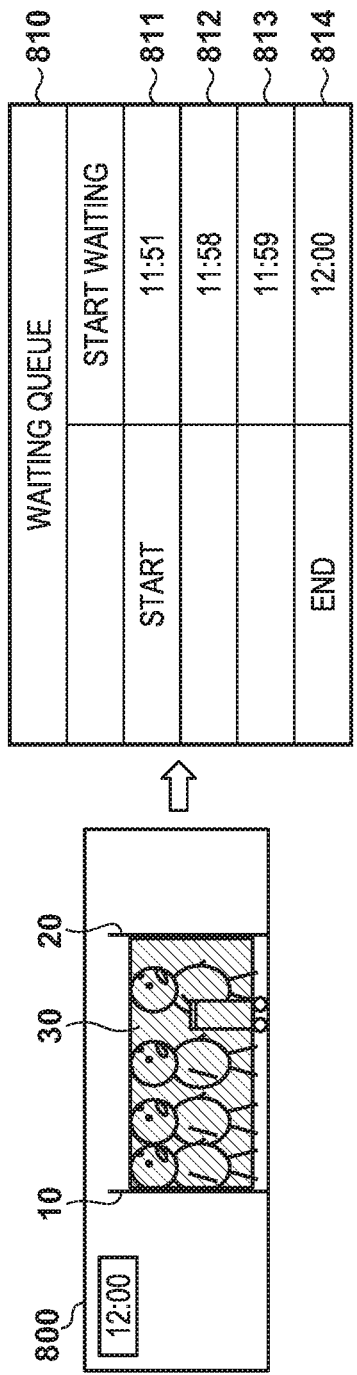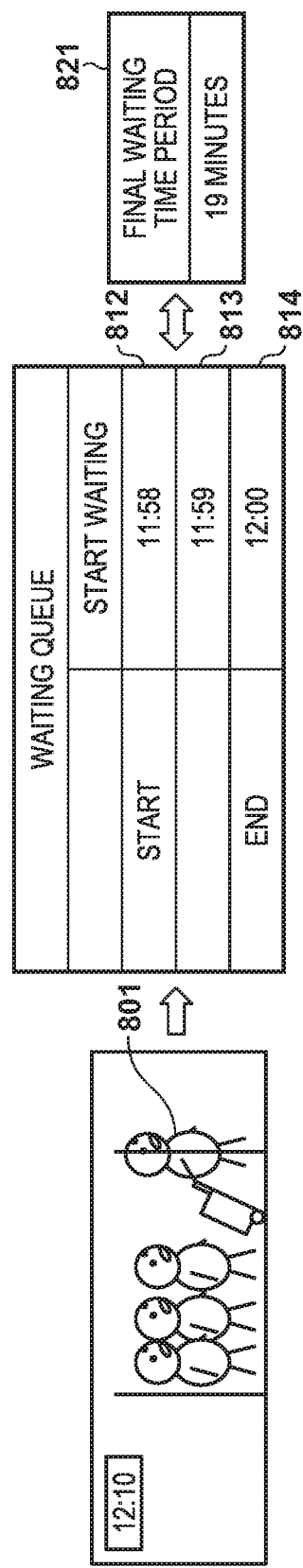

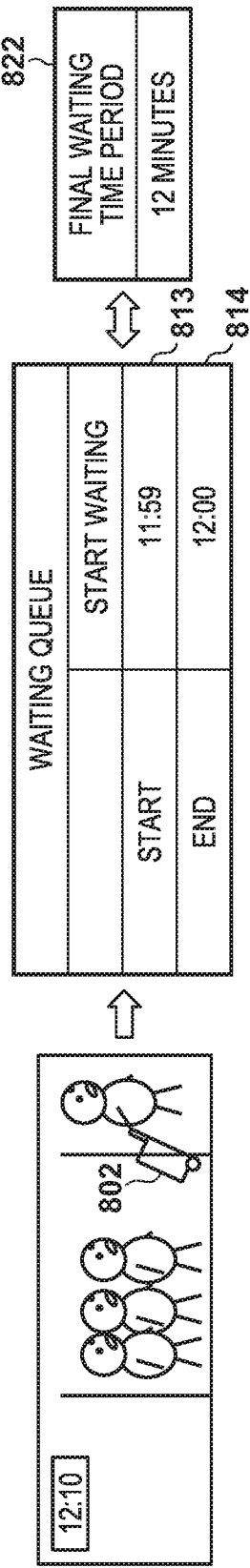
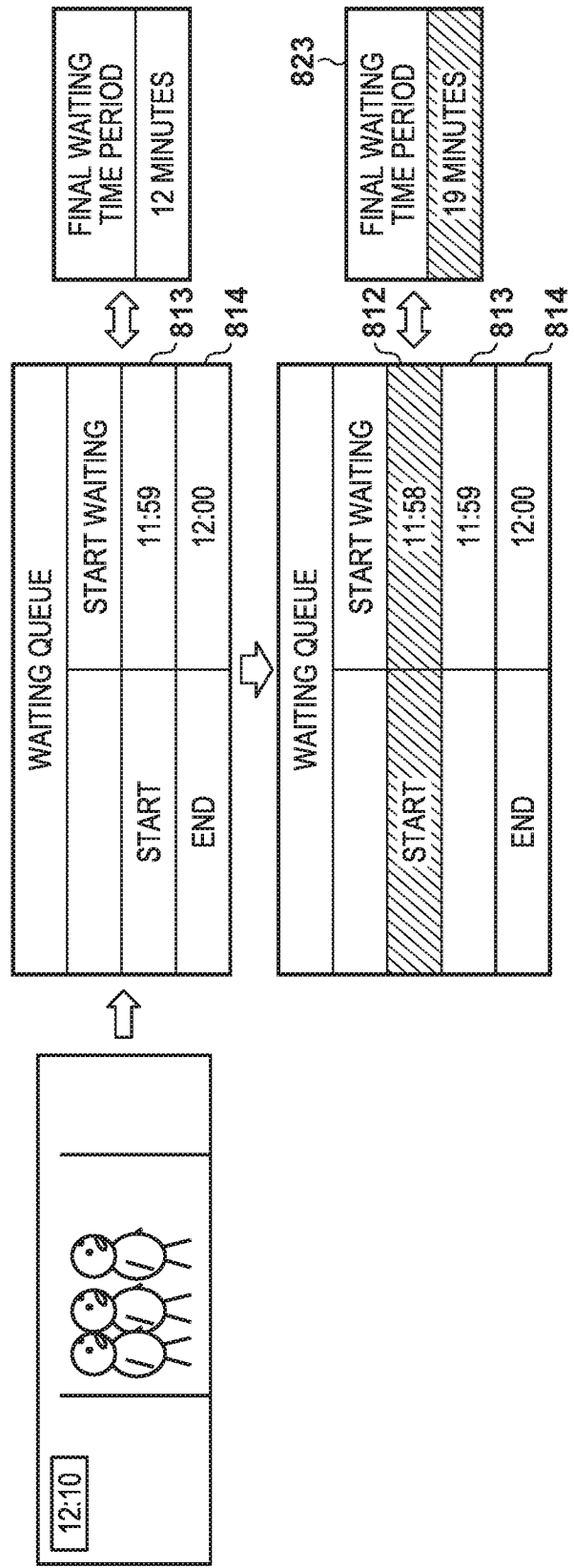
FIG. 8C
FIG. 8D

INFORMATION PROCESSING APPARATUS, METHOD FOR CONTROLLING THE SAME, AND NON-TRANSITORY COMPUTER-READABLE STORAGE MEDIUM

BACKGROUND OF THE INVENTION

Field of the Invention

The present invention relates to a technique for measuring waiting time in a queue.

Description of the Related Art

Conventionally, there has been a technique for detecting the number of people who enter a certain area and the number of people who go out therefrom, and measuring the number of people who stay in the certain area using these values. Japanese Patent Laid-Open No. 2008-217289 discloses that the direction in which a person moves is detected, the number of people who enter a room and the number of people who leave the room are counted, and the number of people who stay in the room is measured using these values.

Also, there is a technique for correcting an error that arises while the number of people who enter or leave a certain area is counted. Japanese Patent Laid-Open No. 2004-287752 discloses that the number of people in an area is counted using the number of people who pass through two ends of the area, and the number of people is corrected by counting the number of people in an image showing the overall area.

In a system in which customers queue up in order to receive a service, there is a need to know the waiting time period of each person and statistics thereof. As a method therefor, a method in which an object that passes through the entrance and the exit of a queue-up area is detected, and a difference between an entrance passing time (time when an object starts to wait in a queue) and an exit passing time (time when the object exits the queue) is calculated as the waiting time period of each person.

However, with the above-described method, there were cases where the detected number of people who pass therethrough is different from the actual number of people who pass therethrough, depending on the situation at the time of passing, and thus the waiting time period was not measured correctly in some cases.

SUMMARY OF THE INVENTION

The present disclosure provides a technique for precisely holding data relating to objects to be measured that queue up in a predetermined region.

According to one aspect of the present invention, there is provided an information processing apparatus which comprises: a detection unit configured to detect an object that enters or exits a predetermined region; a management unit configured to manage, in a queue, data based on the detection performed by the detection unit; and a counting unit configured to count the number of predetermined object(s) based on an image obtained by capturing the predetermined region, wherein in a case where the detection unit detects the predetermined object, the management unit corrects the queue based on the number counted by the counting unit and the number of data managed in the queue.

Further features of the present invention will become apparent from the following description of exemplary embodiments (with reference to the attached drawings).

BRIEF DESCRIPTION OF THE DRAWINGS

FIGS. 1A to 1F are diagrams showing the operation of a general waiting time measurement system.

FIGS. 2A to 2D are diagrams showing one example of a process in which an error arises in a waiting queue of the general waiting time measurement system.

FIG. 4 is a functional block diagram of the waiting time measurement system.

FIGS. 5A to 5D are diagrams showing a correction example in a case where an object other than the objects to be measured is detected at an entrance.

FIGS. 6A to 6C are diagrams showing a correction example in a case where objects to be measured are detected in an overlapping state at the entrance.

FIGS. 7A to 7C are diagrams showing a correction example in a case where objects to be measured are detected in an overlapping state at the exit.

FIGS. 8A to 8D are diagrams showing a correction example in a case where an object other than the objects to be measured is detected at the exit.

DESCRIPTION OF THE EMBODIMENTS

Figure 3:
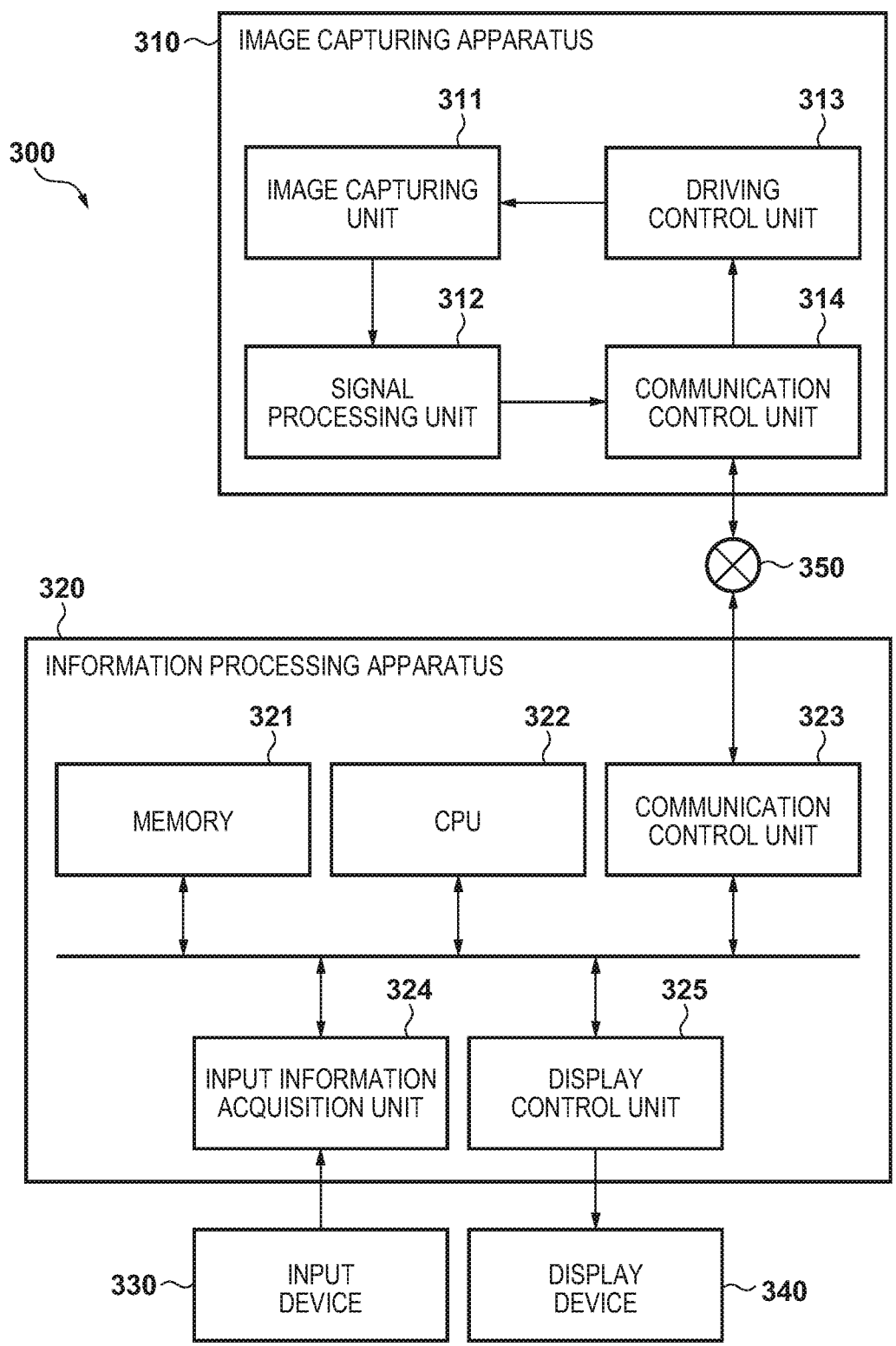
FIG. 3 is a block diagram showing a configuration example of the waiting time measurement system.

Hereinafter, an embodiment of the present invention will be described in detail with reference to the drawings. Note that the configuration described in the following embodiment is one example, and the present invention is not limited to the illustrated configuration.

Prior to detailed description of the embodiment according to the present invention, an error in a waiting queue that may arise in a general waiting time measurement system will be described. The waiting time measurement system is for measuring the time when an object to be measured (for example, a person) actually enters a given region or the time when the object to be measured actually exits the region, using a waiting queue (queue; FIFO data structure). A waiting queue is one of the basic data structures of a computer, and data is held in a first-in first-out list structure.

FIGS. 1A to 1F are diagrams showing the operation of a general waiting time measurement system. FIGS. 1A to 1F are arranged in chronological order, and diagrams on the left in FIGS. 1A to 1F show a display screen 100 of the waiting time measurement system. Video that is transmitted from a camera (not shown), the current time, lines (entrance 10 and exit 20) for passage detection, and the like are displayed on the display screen 100. Diagrams on the right in FIGS. 1A to 1F show a waiting queue 110.

On the display screen 100, when an object that has passed through the entrance 10 is detected, the time when the object has passed through the entrance 10 is added to an end of the waiting queue (queue) 110 as data indicating a queue waiting start time. Also, when an object that has passed through the exit 20 is detected, start data in the waiting queue (queue) 110 is deleted. In this manner, the time when an object that enters and exits a region 30 (area from the entrance 10 to the exit 20) starts to wait is managed by the waiting queue 110 with respect to which data is added and deleted every time entering or exiting of an object is detected.

As shown in FIG. 1A, there are no people queued up in the region 30 at time 12:00. This indicates that the waiting queue 110 is empty. Next, in FIG. 1B (time 12:01), an object 101 passing through the entrance 10 is detected. Thus, data 111 indicating the waiting start time (time 12:01) is added to an end of the waiting queue 110. (At this time, the data 111 is start data as well as end data of the waiting queue in terms of the data structure.) Similarly, in FIG. 1C (time 12:02), an object 102 passing through the entrance 10 is detected, and data 112 indicating the waiting start time (time 12:02) is added to the end of the waiting queue 110. In FIG. 1D (time 12:03), the fact that two persons have queued up in the region 30 is displayed on the display screen 100. The waiting queue 110 holds the data 111 and 112, and two persons are queued up.

In FIG. 1E (time 12:08), an object 103 passing through the exit 20 is detected. The start data 111 of the waiting queue 110 is deleted in response to the detection of the object passing through the exit, (the data 112 becomes start data of the waiting queue in response to this deletion, but is also end data in terms of the data structure) At this time, a difference (7 minutes) between the time (time 12:08) when the object 103 passes through the exit is detected and the time (time 12:01) held in the data 111 to be deleted is calculated as the time period during which the object that last exited the queue was queued up). Moreover, this time period is displayed on a display device (not shown) or the like as the final waiting time period 113. Similarly, in FIG. 1F (time 12:12), an object 104 passing through the exit 20 is detected, and the data 112, which is the start data of the waiting queue 110, is deleted (waiting queue 110 becomes empty). Then, the final waiting time period 114 is displayed.

In this manner, in a general waiting time measurement system, it is possible to measure the time when objects to be measured that are arranged in a certain area start waiting, using a waiting queue with respect to which data is added or deleted every time entering or exiting of an object is detected. However, in the above-described system, there are cases where passage of objects whose waiting time period is to be measured is underdetected or overdetected, depending on the situation of the passing object. Thus, the queue indicated in the waiting queue does not coincide with the actual queue of objects to be measured, and an accurate waiting time period was not measured in some cases. This issue will be described with reference to FIGS. 2A to 2D.

FIGS. 2A to 2D are diagrams showing one example of a process in which an error arises in a waiting queue of the general waiting time measurement system. An example in which an object other than persons, which are objects whose waiting time period is to be measured, is detected at the entrance will be described. FIGS. 2A to 2D are arranged in chronological order, and detailed description is omitted because reference numerals that are the same as those of FIGS. 1A to 1F are as described above. A display screen 200 and a waiting queue 210 are shown in FIGS. 2A to 2D.

In FIG. 2A (time 12:00), the fact that two persons have queued up in the region 30 is displayed on the display screen 200. Data 211 and 212 are held in the waiting queue 210. The waiting start time in the start data 211 of the waiting queue 210 is time 11:50, and the waiting start time in the end data 212 is time 11:58.

In FIG. 2B (time 12:01), an object 201 passing through the entrance 10 is detected, and data 213 is added to the end of the waiting queue 210. Next, in FIG. 2C (time 12:01), an object 202 (suitcase held by a person) passing through the entrance 10 is detected. Then, the data 214 is added to the end of the waiting queue 210 in response to the detection.

In this case, as shown in FIG. 2D (time 12:02), the number of people who are actually queued up in the region 30 is three, but the waiting queue 210 holds the data 211 to 214, showing that four persons are queued up.

In the present embodiment, if an error arises between the queue number shown in the waiting queue and the actual queue number of objects to be measured in this manner, this error is corrected in the waiting queue. For example, persons present in the region 30 (objects to be measured in the waiting time measurement system) are identified through image recognition using a camera (not shown) configured to capture an image of the overall region 30 and the number of people is detected. In this case, it is determined that the suitcase that is detected as the object 202 is not an object to be measured, and the number of people who are queued up is detected to be three. The waiting queue can be modified based on this detection result, at this time, and it is important which data in the waiting queue is modified (that is, added or deleted). This is because the waiting start time held in the waiting queue is utilized to calculate the waiting time period in the waiting time measurement system.

For example, for correction, in order to delete one of the pieces of data 211 to 214 of the waiting queue 210, the case where the start data 211 of the waiting queue 210 is deleted, and the case where the end data 214 of the waiting queue 210 is deleted are considered. In the case where the data 211 is deleted, the data 212 becomes the start data and the waiting start time is time 11:58. In the case where the data 214 is deleted, the start data is the data 211 becomes the start data and the waiting start time is time 11:50. In this manner, the waiting start time of the start data varies depending on which data is deleted, and thus the waiting time measurement result is influenced.

In the embodiment according to the present invention, if an error arises between the waiting queue and the actual queue of the objects to be measured, the end data or the start data of the waiting queue is modified in accordance with whether the detected object passed through the entrance or the exit. Moreover, correcting the waiting queue so as to coincide with the actual queue makes it possible to accurately measure the waiting time period.

FIG. 3 is a block diagram showing a configuration example of the waiting time measurement system. A waiting time measurement system 300 includes an image capturing apparatus 310, an information processing apparatus 320, an input device 330, a display device 340, and a network 350.

The image capturing apparatus 310 is an apparatus configured to capture an image and generate a captured image, and is constituted by a network camera, for example. The information processing apparatus 320 gives an instruction to drive the image capturing apparatus 310 and performs control to display the captured image, as well as detecting passage of an object, detecting the number of people in a predetermined region, managing the waiting queue, displaying the waiting time period, and the like based on the image captured by the image capturing apparatus 310.

The input device 330 is constituted by a mouse, a keyboard, and the like, and performs a user input on the information processing apparatus 320. The display device 340 displays the image output from the information processing apparatus 320 and the measured waiting time period. Although the information processing apparatus 320 and the display device 340 are shown as separate apparatuses in FIG. 3, the information processing apparatus 320 and the display device 340 may be configured integrally or a plurality of display devices 340 may be provided for display to customers.

The network 350 is connected to the image capturing apparatus 310 and the information processing apparatus 320. The network 350 is constituted by a plurality of routers, switches, cables and the like that meet a communication standard such as Ethernet (registered trademark), for example. In the present invention, there are no limitation on the communication standard, scale, and configuration as long as communication is possible between the image capturing apparatus 310 and the information processing apparatus 320. For example, the network 350 may be constituted by the Internet, a wired LAN (Local Area Network), a wireless LAN, a WAN (Wide Area Network), or the like.

The image capturing apparatus 310 includes an image capturing unit 311, a signal processing unit 312, a driving control unit 313, and a communication control unit 314. The image capturing unit 311 has an image sensor and an optical system for a subject on the image sensor, and performs image capture on the image sensor with an intersection point of an optical axis of the optical system and the image sensor as the center of image capture. The image sensor is an image sensor such as a CMOS (Complementary Metal-Oxide Semiconductor) or a CCD (Charged Coupled Device).

The signal processing unit 312 performs processing on signals of the image captured by the image capturing unit 311. For example, the signal processing unit 312 encodes the image captured by the image capturing unit 311, for example. JPEG (Joint Photographic Experts Group) can be used as the encoding method, for example. Alternatively, H.264/MPEG-4 AVC (H.264 hereinafter) can be used as the encoding method. Alternatively, HEVC (High Efficiency Video Coding method) can be used as the encoding method. However, the encoding method is not limited thereto. Also, the signal processing unit 312 may select an encoding method from among a plurality of encoding methods and perform encoding.

The driving control unit 313 performs control to change the image capture direction and the angle of view of the image capturing unit 311. Although a case where the image capturing unit 311 can change the image capture direction to the pan direction or the tilt direction and can change the image capture angle of view will be described in the present embodiment, the present invention is not limited thereto. The image capturing apparatus 310 may not have the function of changing the image capture direction to the pan direction or the tilt direction, and may not have the function of changing the angle of view. The communication control unit 314 transmits the captured image on which processing was performed by the signal processing unit 312 to the information processing apparatus 320. Moreover, the communication control unit 314 receives a control command for the image capturing apparatus 310 from the information processing apparatus 320.

The information processing apparatus 320 includes a memory 321, a CPU 322, a communication control unit 323, an input information acquisition unit 324, and a display control unit 325. The memory 321 stores the content of programs and various data used in processing of the programs. The CPU 322 performs waiting queue management processing, which will be described later, and the like, by reading and executing a program stored in the memory 321. The communication control unit 323 transmits a control command to the image capturing apparatus 310. The input information acquisition unit 324 accepts a user input from the input device 330. The display control unit 325 outputs video to the display device 340 in accordance with the results of program processing performed by the CPU 322.

FIG. 4 is a functional block diagram of the waiting time measurement system. The waiting time measurement system 300 includes an image capturing unit 410, an entry and exit detection unit 411, a number-of-people detection unit 412, a waiting queue generation unit 413, a waiting queue correction unit 414, a setting unit 415, a display unit 416, and a communication unit 417.

The image capturing unit 410 is a processing block realized by the image capturing apparatus 310. The entry and exit detection unit 411, the number-of-people detection unit 412, the waiting queue generation unit 413, and the waiting queue correction unit 414 are processing blocks realized by the CPU 322 and the memory 321.

The entry and exit detection unit 411 detects objects that enter or exit a predetermined region (people count area). For example, in FIG. 1, the entry and exit detection unit is for detecting objects that pass through the entrance 10 and the exit 20. Although detection of an object passing through a line at the entrance 10 and the exit 20 is performed by analyzing the images captured by the image capturing unit 410 in the present embodiment, detection may be performed using any apparatus such as a physical sensor as long as detection of object passage is possible.

The number-of-people detection unit 412 detects objects to be measured (persons, for example) from the image obtained by the image capturing unit 410 capturing a predetermined region, through image recognition, and counts the number of the objects to be measured that are present in the predetermined region.

The waiting queue generation unit 413 adds data indicating the time when the object was detected to the end of the waiting queue when the entry and exit detection unit 411 detects passage of an object at the entrance 10, and deletes data from the start of the waiting queue when the entry and exit detection unit 411 detects passage of an object at the exit 20. Also, when passage of the object was detected at the exit 20 and the data is deleted from the waiting queue, the waiting queue generation unit 413 calculates, as the waiting time period, a difference between the time shown in the data to be deleted and the time when passage of the object is detected at the exit 20, and causes the display unit 416 to display the calculated difference. Note that the time when passage of the object is detected is acquired by a time acquisition unit.

If passage of the object is detected by the entry and exit detection unit 411 at the entrance 10 or the exit 20, the waiting queue correction unit 414 requests the number-of-people detection unit 412 to detect the number of people, and if the result is different from the number of data in the waiting queue held by the waiting queue generation unit 413, the waiting queue correction unit 414 correct the data in the waiting queue. Also, the waiting queue and the settings relating to the waiting queue correction can be set by the setting unit 415. For example, it is possible to set how many seconds after the entry and exit detection unit 411 detects the passage of the object to count the objects that are to be measured and are present in the predetermined region. Also, it is possible to transmit the waiting time period to an external apparatus via the communication unit 417.

Next, correction in a case where an error arises between the number of people indicated by the waiting queue and the number of people in the actual queue will be described with reference to FIGS. 5A to 8D. FIGS. 5A to 8D are respectively arranged in chronological order, and detailed description is omitted because reference numerals that are the same as those of FIGS. 1A to 1F are as described above. Also, description is given that settings are configured in the setting unit 415 such that the waiting queue correction unit 414 instructs the number-of-people detection unit 412 to count the objects to be measured, after a predetermined period of time (after several seconds, for example) from when the entry and exit detection unit 411 detects the passage of the object.

FIGS. 5A to 5D are diagrams showing a correction example in a case where an object other than the objects to be measured is detected at an entrance. A display screen 500 and a waiting queue 510 are shown in FIGS. 5A to 5D.

In FIG. 5A (time 12:00), the fact that two persons have queued up in the region 30 is displayed on the display screen 500. The waiting queue 510 holds data 511 and data 512, and the queue number in the region 30 coincides with the number of data in the waiting queue 510. In FIG. 5B (time 12:01), an object 501 passing through the entrance 10 is detected, and data 513 is added to the end of the waiting queue 510.

In FIG. 5C (time 12:01), the entry and exit detection unit 411 detects an object 502 (suitcase) passing through the entrance 10, and the waiting queue generation unit 413 adds data 514 to the end of the waiting queue 510.

In FIG. 5D (time 12:02), the waiting queue correction unit 414 request the number-of-people detection unit 412 to detect the number of people in response to elapse of a predetermined time from time 12:01 when the entry and exit detection unit 411 detects the object 501. The number-of-people detection unit 412 detects that the number of people who are queued up in the region 30 is three. Because the number of data in the waiting queue 510 is four, the waiting queue correction unit 414 determines that an error (one person greater than the actual queue number) has arisen. Here, it is thought that because the entry and exit detection unit 411 detects an object at the entrance 10 and an error arises after a given time from when the waiting queue generation unit 413 adds the data 514 to the end of the waiting queue, the data operation on the end is the cause of the error. Thus, the waiting queue correction unit 414 performs correction to delete the data 514 at the end of the waiting queue. The waiting queue 510 after correction coincides with the actual queue.

FIGS. 6A to 6C are diagrams showing a correction example in a case where objects to be measured are detected in an overlapping state at the entrance. A display screen 600 and a waiting queue 610 are shown in FIGS. 6A to 6C.

In FIG. 6A (time 12:00), the fact that two persons have queued up in the region 30 is displayed on the display screen 600. The waiting queue 610 holds data 611 and data 612, and the queue number in the region 30 coincides with the number of data in the waiting queue 610.

In FIG. 6B (time 12:01), the entry and exit detection unit 411 detects an object 601 passing through the entrance 10. Herein, the image on the display screen 600 is an image in which two persons who overlap with each other pass through the entrance 10, and thus the entry and exit detection unit 411 detects the two overlapping persons as one object 601. In response to the entry and exit detection unit 411 detecting the object that has passed through the entrance, the waiting queue generation unit 413 adds data 613 to the end of the waiting queue 610.

In FIG. 6C (time 12:02), the waiting queue correction unit 414 request the number-of-people detection unit 412 to detect the number of people in response to elapse of a predetermined time from time 12:01 when the entry and exit detection unit 411 detects the object 601. The number-of-people detection unit 412 detects that the number of people who are queued up in the region 30 is four. Because the number of data in the waiting queue 610 is three, the waiting queue correction unit 414 determines that an error (one person less than the actual queue number) are arisen. Here, it is thought that because the entry and exit detection unit 411 detects an object at the entrance 10 and an error arises after a given time from when the waiting queue generation unit 413 adds the data 613 to the end of the waiting queue, the data operation on the end is the cause of the error. Thus, the waiting queue correction unit 414 performs correction to add the data 614 at the end of the waiting queue. The waiting start time in the data 614 to be added is waiting start time that is the same as that of the data 613 at the end of the waiting queue before correction. The waiting queue 610 after correction coincides with the actual queue.

FIGS. 7A to 7C are diagrams showing a correction example in a case where objects to be measured are detected in an overlapping state at the exit. A display screen 700 and a waiting queue 710 are shown in FIGS. 7A to 7C.

In FIG. 7A (time 12:01), the fact that three persons have queued up in the region 30 is displayed on the display screen 700. The waiting queue 710 holds data 711, 712, and 713, and the queue number in the region 30 coincides with the number of data in the waiting queue 710.

In FIG. 7B (time 12:09), the entry and exit detection unit 411 detects an object 701 passing through the exit 20. Herein, the image on the display screen 700 is an image in which two persons who overlap with each other pass through the exit 20, and thus the entry and exit detection unit 411 detects the two overlapping persons as one object 701. In response to the entry and exit detection unit 411 detecting the objects that have passed through the exit, the waiting queue generation unit 413 deletes the start data 711 from the waiting queue 710. Also, the waiting queue generation unit 413 calculates a difference between the waiting start time (time 11:50) of the deleted data 711 and the time (time 12:09) when the entry and exit detection unit 411 detected the object 701. Then, the display unit 416 displays the calculation result as the final waiting time period 721 (19 minutes) showing the time period during which the object that last exited the queue was queued up.

In FIG. 7C (time 12:09), the waiting queue correction unit 414 request the number-of-people detection unit 412 to detect the number of people in response to elapse of a predetermined time from time 12:09 when the entry and exit detection unit 411 detects the object 701. The number-of-people detection unit 412 detects that the number of people who are queued up in the region 30 is one. Because the number of data in the waiting queue 710 is two, the waiting queue correction unit 414 determines that an error (one person greater than the actual queue number) has arisen. Here, it is thought that because the entry and exit detection unit 411 detects an object at the exit 20, and an error arises after a given time from when the waiting queue generation unit 413 deletes the start data of the waiting queue, the data operation on the start is the cause of the error. Thus, the waiting queue correction unit 414 performs correction to delete the start data 712 of the waiting queue. At this time, the waiting queue generation unit 413 calculates a difference between the waiting start time (time 11:58) of the deleted data 712 and the time (time 12:09) when the entry and exit detection unit 411 detected the object 701 at the exit 20, and causes the display unit 416 to display the calculated difference as a final waiting time period 722 (11 minutes). The waiting queue 710 after correction coincides with the actual queue.

FIGS. 8A to 8D are diagrams showing a correction example in a case where an object other than the objects to be measured is detected at the exit. A display screen 800 and a waiting queue 810 are shown in FIGS. 8A to 8D.

In FIG. 8A (time 12:00), the fact that four persons have queued up in the region 30 is displayed on the display screen 800. The waiting queue 810 holds data 811 to data 814, and the queue number in the region 30 coincides with the number of data in the waiting queue 810.

In FIG. 8B (time 12:10), the entry and exit detection unit 411 detects an object 801 passing through the exit 20, and the waiting queue generation unit 413 deletes the start data 811 from the waiting queue 810. Also, the waiting queue generation unit 413 calculates a difference between the waiting start time (time 11:51) of the deleted data 811 and the time (time 12:10) when the entry and exit detection unit 411 detected the object 801. Then, the display unit 416 displays the calculation result as the final waiting time period 821 (19 minutes) showing the time period during which the object that last exited the queue was queued up.

In FIG. 8C (time 12:10), the entry and exit detection unit 411 detects an object 802 (suitcase) passing through the exit 20. The waiting queue generation unit 413 deletes the data 812 from the start of the waiting queue 810. Also, the waiting queue generation unit 413 calculates a difference between the waiting start time (time 11:58) of the deleted data 812 and the time (time 12:10) when the entry and exit detection unit 411 detected the object 802. Then, the display unit 416 displays the calculation result as the final waiting time period 822 (12 minutes).

In FIG. 8D (time 12:10), the waiting queue correction unit 414 request the number-of-people detection unit 412 to detect the number of people in response to elapse of a predetermined time from time 12:10 when the entry and exit detection unit 411 detects the object 801. The number-of-people detection unit 412 detects that the number of people who are queued up in the region 30 is three. Because the number of data in the waiting queue 830 is two, the waiting queue correction unit 414 determines that an error (one person less than the actual queue number) has arisen. Here, it is thought that because the entry and exit detection unit 411 detects an object at the exit 20, and an error arises after a given time from when the waiting queue generation unit 413 deletes the start data of the waiting queue, the data operation on the start is the cause of the error. Thus, the waiting queue correction unit 414 performs correction for returning (adding) data 812 with the latest waiting start time, in the deleted data, to the start of the waiting queue 830. At this time, the waiting queue generation unit 413 also returns the display of the final waiting to the state prior to deletion of the data 812, as the final waiting time period 823 (19 minutes). The waiting queue 810 after correction coincides with the actual queue.

Next, processing according to the present embodiment will be described using flowcharts shown in FIGS. 9 and 10. Note that steps in FIGS. 9 and 10 are executed by the CPU 322 controlling the information processing apparatus 320 based on a predetermined computer program.

Figure 9:
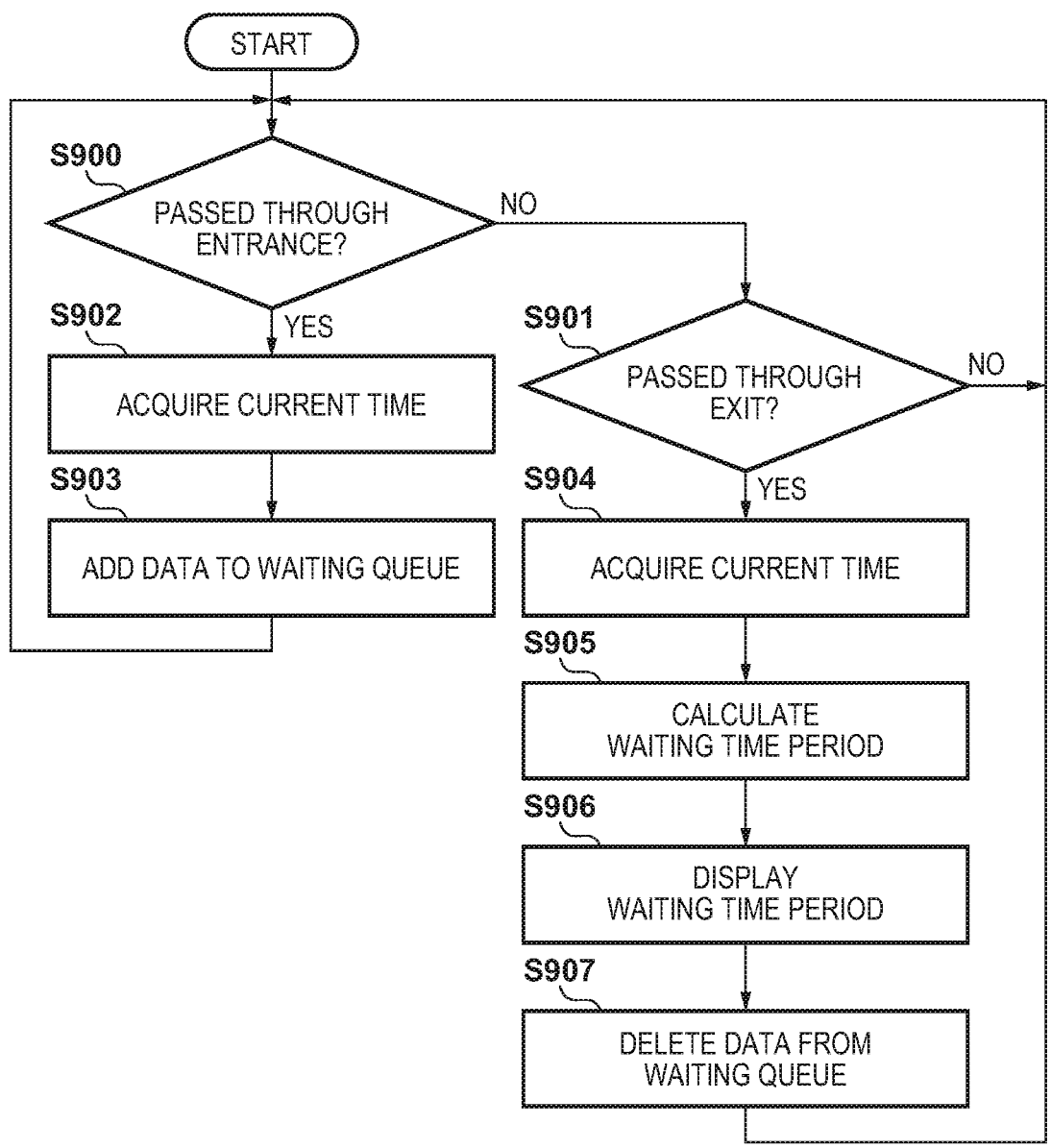
FIG. 9 is a flowchart showing waiting queue generation processing.
Figure 10:
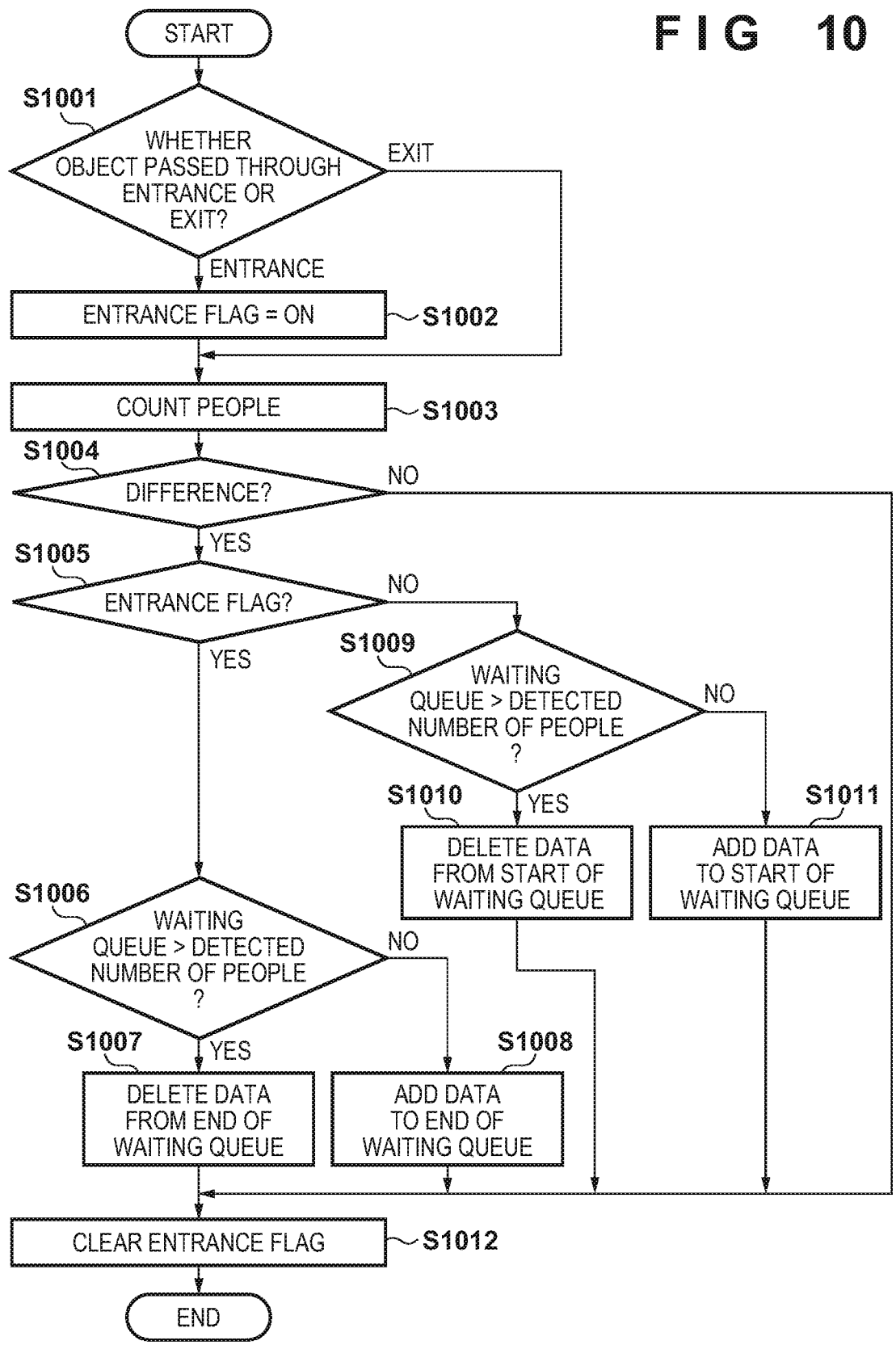
FIG. 10 is a flowchart showing waiting queue correction processing.

FIG. 9 is a flowchart showing waiting queue generation processing. This processing is started when the information processing apparatus 320 is powered on, and is repeated until a stop instruction is given by the CPU 322.

First, when the processing is started, in step S900, the entry and exit detection unit 411 determines whether or not an object that has passed through the entrance of the people count area has been detected. If it is determined that an object has not been detected (NO in step S900), processing advances to step S901. If it is determined that an object has been detected (YES in step S900), processing advances to step S902.

In step S901, the entry and exit detection unit 411 determines whether or not an object that has passed through the exit of the people count area has been detected. If it is determined that an object has not been detected (NO in step S901), the processing returns to step S900, and the processing is repeated until an object is detected at the entrance or the exit. If it is determined that an object has been detected at the exit (YES in step S901), the processing advances to step S904.

In step S902, the waiting queue generation unit 413 acquires the current time. In step S903, the waiting queue generation unit 413 adds data in which the time acquired in step S902 is the waiting start time to the end of the waiting queue, and the processing returns to step S900.

In step S904, the waiting queue generation unit 413 acquires the current time. In step S905, the waiting queue generation unit 413 calculates the waiting time period. Here, the waiting time period is obtained from a difference between the time of the start data in the waiting queue and the current time acquired in step S904.

In step S906, the waiting queue generation unit 413 gives an instruction to display the waiting time period. Here, the waiting time period to be displayed is the time obtained in step S905. In step S907, the waiting queue generation unit 413 deletes the start data from the waiting queue, and the processing returns to step S900.

FIG. 10 is a flowchart showing waiting queue correction processing. This processing is started in response to the detection of the entry and exit by the entry and exit detection unit 411. Note that, as described above, settings may be configured in the setting unit 415 such that correction processing is executed after the elapse of a predetermined time from when the entry or exit is detected.

In step S1001, the waiting queue correction unit 414 determines whether an object is detected at the entrance or the exit of the person counting area. If it is determined that an object is detected at the entrance (entrance in step S1001), the processing advances to step S1002. If it is determined that the object is detected at the exit (exit in step S1001), the processing advances to step S1003.

In step S1002, the waiting queue correction unit 414 changes an entrance flag to ON. In step S1003, the waiting queue correction unit 414 instructs the number-of-people detection unit 412 to detect the number of people in the people count area. The number of people is detected by recognizing persons in a captured image, for example.

In step S1004, the waiting queue correction unit 414 determines whether or not there is a difference between the number of people in the queue detected by the number-of-people detection unit 412 and the number of data in the waiting queue. If it is determined that there is no difference (NO in step S1004), the processing advances to step S1012. If it is determined that there is a difference (YES in step S1004), the processing advances to step S1005.

In step S1005, the waiting queue correction unit 414 determines whether or not the entrance flag is ON. It is necessary to modify the end of the waiting queue if an error arises at the entrance, and to modify the start of the waiting queue if an error arises at the exit. In view of this, checking the entrance flag makes it possible to determine whether an error arises at the time of passing through the entrance or at the time of passing through the exit.

If it is determined that the entrance flag is ON, that is, an error arises at the time of passing through the entrance (YES in step S1005), the processing advances to step S1006. If it is determined that the entrance flag is not ON, that is, an error arises at the time of passing through the exit (NO in step S1005), the processing advances to step S1009.

In step S1006 and step S1009, the waiting queue correction unit 414 determines which of the number of data in the waiting queue and the detected number of people in the queue is larger. This determination is made in order to perform correction by deleting data from the waiting queue if the number of data in the waiting queue is larger than the detected number of people in the queue, and by adding data to the waiting queue if the number of data in the waiting queue is smaller than the detected number of people in the queue.

If it is determined that the number of data in the waiting queue is larger than the detected number of people in the queue, when an object is detected at the entrance (YES in step S1006), the processing advances to step S1007. In step S1007, the waiting queue correction unit 414 deletes data from the end of the waiting queue. The number of data to be deleted is the value of the difference obtained in step S1004. This processing is the content described in FIG. 5D.

If it is determined that the number of data in the waiting queue is smaller than the detected number of people in the queue, when an object is detected at the entrance (NO in step S1006), the processing advances to step S1008. In step S1008, the waiting queue correction unit 414 adds data whose waiting start time is the same as that of the end data in the waiting queue to the end of the waiting queue. The number of data to be added is the value of the difference obtained in step S1004. This processing is the content described in FIG. 6C.

If it is determined that the number of data in the waiting queue is larger than the detected number of people in the queue, when an object is detected at the exit (YES in step S1009), the processing advances to step S1010. In step S1010, the waiting queue correction unit 414 deletes data from the start of the waiting queue. The number of data to be deleted is the value of the difference obtained in step S1004. This processing is the content described in FIG. 7C.

If it is determined that the number of data in the waiting queue is smaller than the detected number of people in the queue, when an object is detected at the exit (NO in step S1009), the processing advances to step S1011. In step S1011, the waiting queue correction unit 414 returns (adds) deleted data to the start of the waiting queue in the order of data with the latest waiting start time. The number of data to be returned is the value of the difference obtained in step S1004. This processing is the content described in FIG. 8D.

In step S1012, the waiting queue correction unit 414 clears the entrance flag. Then, the correction processing ends.

As described above, in the present embodiment, it is determined whether to modify the start or the end of the waiting queue, in accordance with whether an object that enters and exits a predetermined region is detected at the entrance or the exit thereof. Thus, it is possible to appropriately generate a waiting queue to be measured and to measure an accurate waiting time period.

Other Embodiments

An embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described embodiment and/or controlling the one or more circuits to perform the functions of one or more of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-139263, filed Jul. 18, 2017, which is hereby incorporated by reference herein in its entirety.

What is claimed is:

1. An information processing apparatus comprising:
one or more processors; and
a memory which stores instructions executable by the one or more processors to cause the information processing apparatus to perform:
  detecting an object that enters or exits a predetermined region;
  managing, in a queue, data based on the detection performed in the detecting; and
  counting a number of predetermined objects based on an image obtained by capturing the predetermined region,
wherein the instructions further cause the information processing apparatus to perform, in a case where the predetermined object is detected, correcting the queue based on the number counted by the counting and a number of data managed in the queue.

2. The information processing apparatus according to claim 1,
wherein the instructions further cause the information processing apparatus to perform determining whether to correct an end or a start of the queue, according to whether the predetermined object is detected at an entrance or an exit of the predetermined region.

3. The information processing apparatus according to claim 2, wherein the instructions further cause the information processing apparatus to perform acquiring a:
  time when the predetermined object that entered the predetermined region is detected, and adding data including the acquired time to the queue, and
  calculating a waiting time period of the predetermined object using a difference between a time of data at the start of the queue and a time when the predetermined object exits the predetermined region.

4. The information processing apparatus according to claim 3, wherein the instructions further cause the information processing apparatus to perform displaying
the waiting time period.

5. The information processing apparatus according to claim 1,
wherein the instructions further cause the information processing apparatus to perform correcting an end of the queue in a case where the predetermined object is detected at an entrance of the predetermined region, and correcting a start of the queue in a case where the predetermined object is detected at an exit of the predetermined region.

6. The information processing apparatus according to claim 1,
wherein the instructions further cause the information processing apparatus to perform adding data to an end of the queue if the predetermined object is detected at an entrance of the predetermined region, and deleting data from a start of the queue if the predetermined object is detected at an exit of the predetermined region.

7. The information processing apparatus according to claim 6,
wherein the instructions further cause the information processing apparatus to perform, if the number of data held in the queue differs from the number of predetermined objects counted by the counting, correcting the queue based on the number of predetermined objects counted by the counting.

8. The information processing apparatus according to claim 6,
wherein the instructions further cause the information processing apparatus to perform
deleting a portion of data from the queue if the number of data held in the queue is larger than the number of predetermined objects counted by the counting; and
adding data to the queue if the number of data held in the queue is smaller than the number of predetermined objects counted by the counting.

9. The information processing apparatus according to claim 6,
wherein the instructions further cause the information processing apparatus to perform, if the number of data held in the queue is smaller than the number of predetermined objects counted by the counting:
in a case where the predetermined object is detected at the entrance of the predetermined region, adding data that is the same as the data added to the queue to the end of the queue in response to the detection, and
in a case where the predetermined object is detected at the exit of the predetermined region, adding data that is the same as the data deleted from the queue to the start of the queue in response to the detection.

10. The information processing apparatus according to claim 1,
wherein the queue holds information relating to a time when it is detected that the predetermined object enters the predetermined region.

11. The information processing apparatus according to claim 1,
wherein the instructions further cause the information processing apparatus to perform detecting the predetermined object using a sensor, and counting the number of the predetermined object by recognizing the predetermined object in the image obtained by capturing the predetermined region.

12. A method for controlling an information processing apparatus that includes one or more processors and a memory which stores instructions executable by the one or more processors, the method comprising:
detecting, by the information processing apparatus, an object that enters or exits a predetermined region;
managing by the information processing apparatus, in a queue, data based on the detection performed in the detecting; and
counting, by the information processing apparatus, a number of predetermined objects based on an image obtained by capturing the predetermined region,
wherein in a case where the predetermined object is detected in the detecting, correcting the queue by the information processing apparatus based on the number counted by the counting and a number of data managed in the queue.

13. The method according to claim 12,
wherein the method further comprises determining whether to correct an end or a start of the queue, according to whether the predetermined object is detected at an entrance or an exit of the predetermined region in the detecting.

14. The method according to claim 13, further comprising:
acquiring a time when a predetermined object that entered the predetermined region is detected in the detecting; and
calculating a waiting time period of the predetermined object,
wherein in the managing, data including the time acquired in the acquiring is added to the queue, and
in the calculating, the waiting time period of the predetermined object is calculated using a difference between a time of data at the start of the queue and a time when the predetermined object exits the predetermined region.

15. The method according to claim 12,
wherein, in the managing, an end of the queue is corrected in a case where the predetermined object is detected at an entrance of the predetermined region in the detecting, and a start of the queue is corrected in a case where the predetermined object is detected at an exit of the predetermined region in the detecting.

16. The method according to claim 12,
wherein in the managing, data is added to an end of the queue if the predetermined object is detected at an entrance of the predetermined region in the detecting, and data is deleted from a start of the queue if the predetermined object is detected at an exit of the predetermined region in the detecting.

17. The method according to claim 16,
wherein if the number of data held in the queue differs from the number of predetermined objects counted in the counting, the queue is corrected in the managing based on the number of predetermined objects counted in the counting.

18. The method according to claim 16,
wherein in the managing,
a portion of data is deleted from the queue if the number of data held in the queue is larger than the number of predetermined objects counted in the counting, and data is added to the queue if the number of data held in the queue is smaller than the number of predetermined objects counted in the counting.

19. The method according to claim 16, wherein if the number of data held in the queue is smaller than the number of predetermined objects counted in the counting, in the managing, in a case where in the detecting, the predetermined object is detected at the entrance of the predetermined region, data that is the same as the data added to the queue is added to the end of the queue in response to the detection, and in a case where in the detecting, the predetermined object is detected at the exit of the predetermined region, data that is the same as the data deleted from the queue is added to the start of the queue in response to the detection.

20. The method according to claim 12, wherein the queue holds information relating to a time when in the detecting, it is detected that the predetermined object enters the predetermined region.

21. A non-transitory computer-readable storage medium storing a computer program for causing a computer to execute a method for controlling an information processing apparatus, the method comprising:

detecting an object that enters or exits a predetermined region;

managing, in a queue, data based on the detection performed in the detecting; and counting a number of predetermined objects based on an image obtained by capturing the predetermined region, wherein in a case where the predetermined object is detected in the detecting, the queue is corrected in the managing based on the number counted by the counting and a number of data managed in the queue.

* * * * *